(12) United States Patent
Grajkowski

(10) Patent No.: US 6,736,107 B1
(45) Date of Patent: May 18, 2004

(54) METHOD FOR CONTROLLING DIRECT FUEL INJECTION OF AN ENGINE DURING STARTING PROCEDURES

(75) Inventor: Karl J. Grajkowski, Plymouth, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/301,899

(22) Filed: Nov. 22, 2002

(51) Int. Cl.[7] .................................................. F02P 5/00
(52) U.S. Cl. .................................. 123/406.11; 123/305
(58) Field of Search ................................ 123/305, 295, 123/594, 609, 612, 406.11, 406.18, 406.47

(56) References Cited

U.S. PATENT DOCUMENTS

| | | | |
|---|---|---|---|
| 4,499,544 A | * 2/1985 | Ohba et al. | 701/102 |
| 5,848,582 A | 12/1998 | Ehlers et al. | 123/486 |
| 5,913,302 A | 6/1999 | Ruman et al. | 123/609 |
| 5,924,404 A | 7/1999 | Ruman et al. | 123/406 |
| 5,964,199 A | 10/1999 | Atago et al. | 123/295 |
| 6,058,906 A | 5/2000 | Yoshino | 123/295 |
| 6,145,490 A | 11/2000 | Heidenfelder et al. | 123/295 |
| 6,161,527 A | 12/2000 | Ruman | 123/533 |
| 6,298,824 B1 | 10/2001 | Suhre | 123/406 |
| 6,588,404 B1 | * 7/2003 | Mathews | 123/479 |

* cited by examiner

*Primary Examiner*—John Kwon
(74) *Attorney, Agent, or Firm*—William D. Lanyi

(57) ABSTRACT

A method is provided for igniting a fuel/air mixture within a preselected time after the fuel/air mixture has been injected into the combustion chamber of a cylinder. In this way, the ignition event occurs while the fuel/air mixture is stratified and before it has an opportunity to mix within the cylinder and become homogenous. By assuring that the fuel/air mixture is stratified, the wetting of cylinder walls is significantly decreased and the variability of conditions within the combustion chamber are reduced.

20 Claims, 2 Drawing Sheets

METHOD FOR CONTROLLING DIRECT FUEL INJECTION OF AN ENGINE DURING STARTING PROCEDURES

BACKGROUND OF THE INVENTION

1. Field of the Invention

The present invention is generally related to a direct fuel injection system for a two cycle internal combustion engine and, more particularly, to a means for facilitating the starting of the engine with a stratified charge.

2. Description of the Prior Art

Direct fuel injection (DFI) engines are well known to those skilled in the art. Engines of this type incorporate a fuel injector that is able to inject a fuel/air mixture into the combustion chamber of the engine when the piston is moving upwardly toward its top dead center (TDC) position. Many techniques for controlling the fueling procedures of the engine are also well known.

U.S. Pat. No. 5,913,302, which issued to Ruman et al on Jun. 22, 1999, discloses an ignition coil dwell time control system. A two stroke injected internal combustion engine has an ignition coil dwell time control system. An electronic control unit controls switching of electronic ignition coil drivers in a manner to minimize ignition coil dwell times at medium and high engine speeds where low ignition coil dwell times can be used without sacrificing engine performance. The electronic control unit also implements an intermittent spark plug cleaning strategy to remove carbon deposits from fouled spark plugs. Intermittent cleaning is accomplished during engine operation by periodically raising the ignition coil dwell time to an exaggerated cleaning level for a relatively short period of time (e.g. one minute) after it is determined the spark plug cleaning should occur (e.g. 10 to 20 engine operating hours since previous cleaning).

U.S. Pat. No. 5,848,582, which issued to Ehlers et al on Dec. 15, 1998, discloses an internal combustion engine with barometric pressure related start of air compensation for a fuel injector. A control system for a fuel injector system for an internal combustion engine is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

U.S. Pat. No. 6,161,527, which issued to Ruman on Dec. 19, 2000, discloses an air assisted direct fuel injection system. The system incorporates a plurality of fuel injection arrangements, wherein each fuel injection is associated with a particular cylinder of the engine. Each of the fuel injection arrangements comprises a fluid passageway in which fuel and air are combined prior to injection into a combustion chamber of the cylinder. A valve is movable with respect to an injection port to allow the pressurized fuel/air mixture to flow from the fluid passageway into the combustion chamber. A fuel injector is used to inject liquid fuel into the fluid passageway to be combined with pressurized air within the passageway. The system has a common air rail and a common fuel rail which are each connected to a plurality of fuel injection arrangements. Upward movement of a piston within the cylinder is used to pressurize the air within the common air rail. All of the fuel injection arrangements can be used to contribute pressurized air to the common air rail.

U.S. Pat. No. 5,924,404, which issued to Ruman et al on Jul. 20, 1999, discloses a cylinder-specific spark ignition control system for direct fuel injected two stroke engine. A direct fuel injected two stroke engine controls spark ignition timing and/or ignition coil dwell time on a cylinder-specific basis. The engine also preferably controls fuel injection timing and amount and injection/delivery duration on a cylinder-specific basis. Cylinder-specific customization of spark ignition and fuel injection allows better coordination of spark with fuel injection which results in better running quality, lower emissions, etc. Memory in the electronic control unit for the engine preferably includes a high resolution global look-up table that determines global values for spark ignition and fuel injection control bases on engine load and engine speed. Memory in the electronic control unit also includes a plurality of low resolution, cylinder-specific offset value look-up tables from which cylinder-specific offset values for spark ignition and fuel injection can be determined, preferably depending on engine load and engine speed. The offset values are combined with the global values to generate cylinder-specific control signals for spark ignition and fuel injection.

U.S. Pat. No. 6,298,824, which issued to Suhre on Oct. 9, 2001, discloses an engine control system using an air and fuel control strategy based on torque demand. The control system for a fuel injected engine provides an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters as a function of engine speed and torque demand, as represented by the position of the throttle handle.

U.S. Pat. No. 6,145,490, which issued to Heidenfelder et al on Nov. 14, 2000, describes a method for operating a direct injection internal combustion engine during starting. A changeover is made between a so-called low-pressure starting with a homogeneous mixture and a so-called high pressure starting with a stratified mixture as a function of an engine coolant temperature. Since, during the high-pressure starting of the internal combustion engine, injection is released only when a pressure in a high-pressure accumulator exceeds a predetermined threshold value, the injected fuel is better prepared. During such high-pressure starting, injection is predetermined by an injection quantity and an angle of the end of injection. Predetermining the angle of the end of injection, in contrast to predetermining an angle of commencement of injection during conventional low-pressure starting, ensures that there is an ignitable mixture present at the sparkplug, specifically irrespective of duration of injection.

U.S. Pat. No. 6,058,906, which issued to Yoshino on May 9, 2000, describes a fuel/air ratio control for an internal combustion engine. An engine system for an internal combustion engine of a type having a stratified combustion mode and a homogenous combustion mode comprises a controller for increasing a fuel air ratio (or equivalence ratio) of an air fuel mixture produced in the engine abruptly in a transient state during transition from the stratified mode to the homogenous mode to ensure stable combustion. The controller estimates a residual EGR gas quantity, and produces a step change in the fuel air ratio when the fuel air ratio enters a predetermined unstable range and the EGR gas still remains in a considerable amount.

U.S. Pat. No. 5,964,199, which issued to Atago et al on Oct. 12, 1999, describes a direct injection system internal combustion engine cont apparatus. In a direct injection internal combustion engine, a stratification combustion condition, a homogenous combustion condition and an intermediate combustion condition, which is intermediate the stratification combustion and the homogenous combustion conditions, are controlled selectively according to an operation condition of at least one selected from a combustion condition, an output condition of the engine and an acceleration condition of a vehicle. Without defeating an intended low fuel consumption operation, the engine operates to obtain a reduction of harmful exhaust gas. As a result, by assuring the low fuel consumption operation, an improvement in combustion stability and smoke reduction can both be realized.

The patents described above are hereby expressly incorporated by reference in the description of the present invention.

Certain internal combustion engines occasionally exhibit certain disadvantageous starting characteristics that can be exacerbated by the use of a homogenous charge during starting procedures. Particularly when the cylinder walls are cold, as a result of the engine being inoperative for a period of time, a homogenous charge can result in the wetting of the cylinder walls when the fuel vapor contacts those walls. The fuel vapor condenses on the cylinder walls and creates a condition in which it is difficult to vaporize the condensed fuel within the combustion chamber. This condition can be further exacerbated by the inherent variability in airflow during the initial movement of the pistons within the cylinders of the engine. It would therefore be significantly beneficial if a method for starting an internal combustion engine could be improved in such a way that reduces the wetting of the cylinder walls with fuel vapor, provides a stratified rather than a homogeneous charge, and compensates for the variability of airflow during the initial movement of the pistons within the cylinders of an internal combustion engine.

SUMMARY OF THE INVENTION

A method for controlling the operation of an internal combustion engine during starting, in accordance with the preferred embodiment of the present invention, comprises the steps of providing a fuel injector for injecting fuel into a combustion chamber within a cylinder of the internal combustion engine and providing an igniting device for igniting the fuel in the combustion chamber. It also comprises the steps of determining when the internal combustion engine is being started subsequent to the engine being inoperative for a preselected period of time and measuring a position of a piston within the cylinder. It comprises the steps of causing the fuel injector to inject fuel into the combustion chamber when the piston is at a first position within the cylinder and subsequently activating the igniting device when the piston is at a second position within the cylinder, wherein the first and second positions in one embodiment of the present invention are within 10° to 20° of crankshaft rotation of each other in relation to the rotational position of the crankshaft of the internal combustion engine.

In an alternative embodiment of the present invention, the first and second piston positions can be within 12° of each other in relation to the rotation position of a crankcase of the internal combustion engine. In a most preferred embodiment of the present invention, the first and second positions are generally 15° apart in relation to the rotational position of the crankshaft. The first position occurs between 45° and 55° before top dead center (BTDC) in relation to the rotational position of the crankshaft and the second position occurs between 30° and 40° before top dead center (BTDC) in relation to the rotational position of the crankshaft.

The activating step occurs when a fuel mixture injected by the fuel injector is stratified. In other words, a spark plug is activated before the fuel mixture has an opportunity to become homogenous. The position of the piston within the cylinder is determined relative to its top dead center (TDC) position, when the piston is at its maximum degree of travel in a direction toward the combustion chamber. The determining step comprises the step of either monitoring a manually operable start switch or measuring an operating speed of the internal combustion engine and comparing the operating speed to a threshold speed magnitude. The internal combustion engine is a direct fuel injected two cycle engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
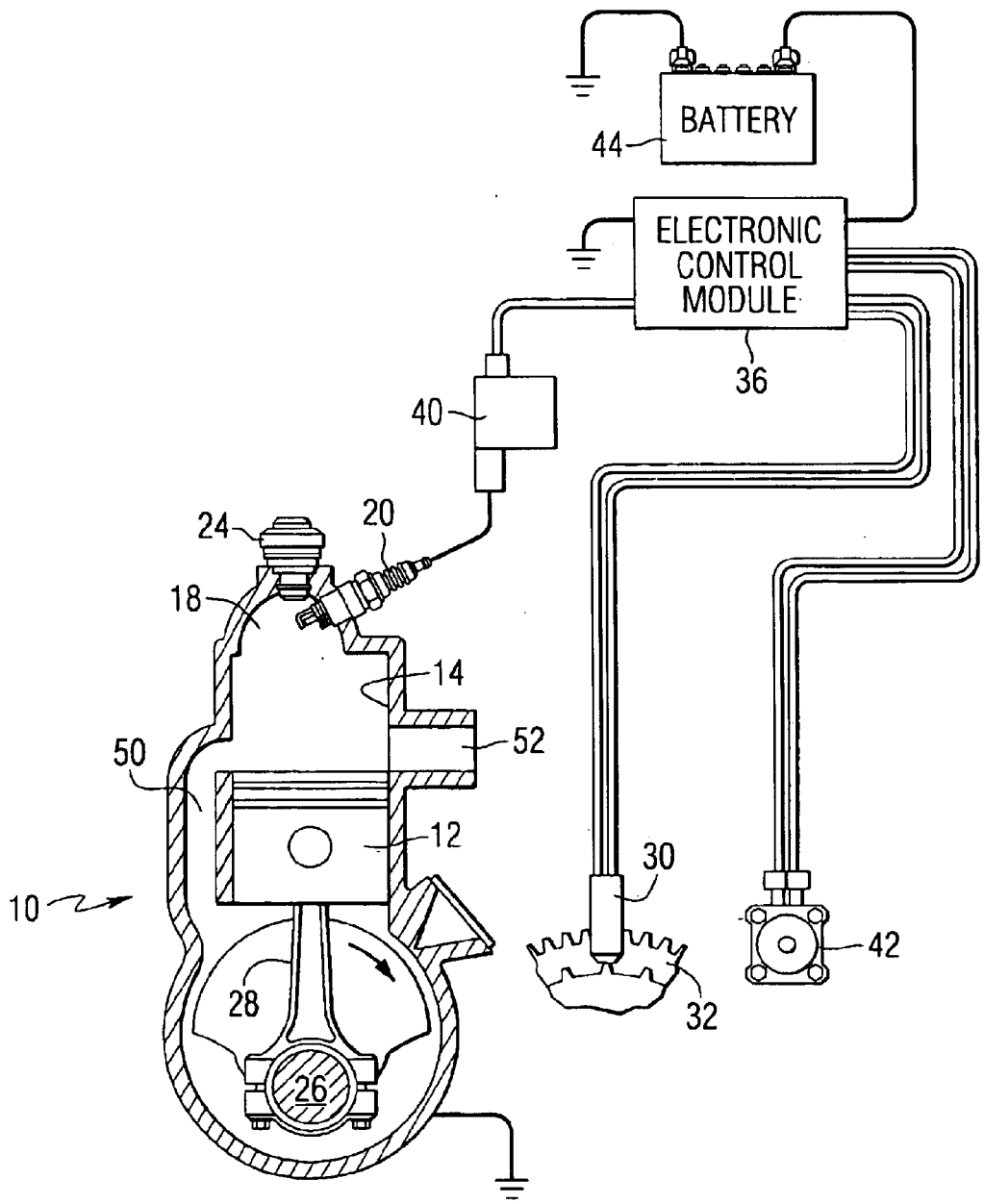
FIG. 1 is a schematic layout of a typical internal combustion engine.

Throughout the description of the preferred embodiment of the present invention, like components will be identified by like reference numerals.

The present invention is generally directed to a method for controlling the injection of fuel and ignition of fuel within the combustion chamber of a cylinder of an internal combustion engine in such a way that it improves the starting characteristics of the engine. Although the present invention can be used in conjunction with various types of internal combustion engines, it has been specifically tested and applied to a two cycle direct fuel injected (DFI) internal combustion engine.

The present invention is intended to improve the starting characteristics of the internal combustion engine, especially at lower temperatures, and to reduce the variability of starting characteristics of direct fuel injected engines.

FIG. 1 is a schematic representation of an internal combustion engine that is described in explicit detail in U.S. Pat. No. 5,913,302. FIG. 1 is provided to show the basic arrangement of various components that are related to the method of the present invention. The engine 10 comprises a piston 12 that moves reciprocally within a cylinder 14. At the upper end of the cylinder 14, a combustion chamber 18 provides a cavity in which a fuel/air mixture is ignited by a spark plug 20. Fuel is injected into the combustion chamber 18 by a fuel injector 24 prior to being ignited by the sparkplug 20.

The reciprocating motion of the piston 12 is in coordination with the rotation of a crankshaft 26 which is connected, by a connected rod 28, to the piston 12.

During each complete rotation of the crankshaft 26, the piston 12 moves through a complete reciprocating cycle from a top dead center (TDC) position to a bottom dead center (BDC) position (which is shown in FIG. 1) and back to a top dead center (TDC) position. A gear tooth sensor 30 is used to measure the rotation of a toothed gear 32 that allows an electronic control module (ECM) 36 to determine the precise position of the crankshaft 26 at any instant in time. An ignition coil 40 is used to energize the sparkplug 20 and is controlled by the engine control module 36. An engine load sensor 42 is also shown in FIG. 1, but is not directly related to the operation of the present invention. A battery 44 is also illustrated. The intake passage 50 and the exhaust passage 52 are also shown in FIG. 1.

Figure 2:
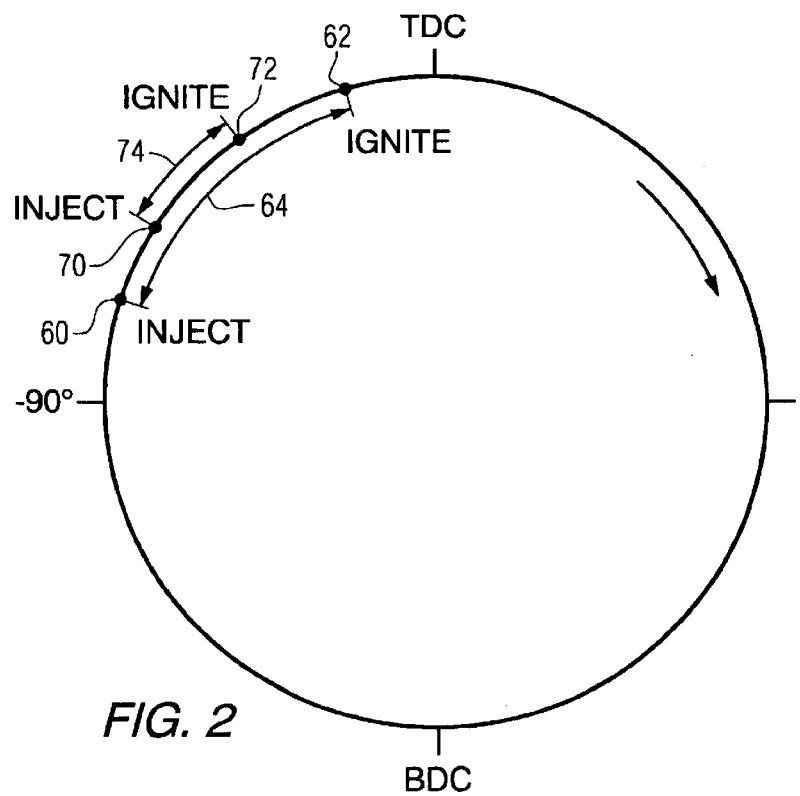
FIG. 2 is a graphical representation of various timing events relating to the fuel injection and ignition within a combustion chamber.

FIG. 2 shows a graphical representation of the relationship between the piston 12 and various occurrences, such as fuel injection and ignition, in relation to the piston's position within the cylinder 14, expressed as an angle in relation to the top dead center (TDC) position and the bottom dead sensor (BDC) position of the piston 12. It should be understood that these angular positions are associated with the angular position of the crankshaft 26 as it rotates to cause the piston 12 to move reciprocally within the cylinder 14.

During starting procedures, certain types of known direct fuel injected (DFI) two cycle engines inject fuel at approximately 60° to 80° before top dead center (BTDC). This is represented by point 60 in FIG. 2. It is also typical to activate the sparkplug 20 when the piston 12 is at approximately 10° to 20° before top dead center (BTDC), as represented by point 62 in FIG. 2. Therefore, the time between the injection of fuel at point 60 and the ignition of the fuel at point 62 is represented by arrow 64. It has been experimentally determined that the allowance of approximately 65° of rotation between the fuel injection occurrence and the ignition occurrence is sufficient time for the fuel to create a homogenous charge and for at least a portion of the fuel to move into contact with the walls of the cylinder 14. As described above, this can cause condensation of some of the fuel/air mixture.

In order to reduce the likelihood that the fuel/air mixture will become homogenous prior to the ignition, at point 62, it has been determined that a significant shortened period of time between injection and ignition is significantly beneficial during starting procedures. For example, the present invention provides for an injection, at point 70, when the piston 12 is approximately 50° before top dead center. This is combined with an ignition time, at point 72, when the piston is approximately 35° before top dead center. The time between the injection and the ignition is represented by arrow 74 in FIG. 2.

With continued reference to FIG. 2, it should be understood that some variability in the precise numbers described above are within the scope of the present invention. For example, the 15°, represented by arrow 74, between the injection event 70 and the ignition event 72 can vary somewhat without sacrificing the beneficial results of the present invention. A separation of between 12° and 18°, between points 70 and 72, is considered to work well for the intended purpose of improving the starting characteristics of the internal combustion engine. A time of approximately 20° between the injection event at point 70 and the ignition event at point 72 is possibly also a viable alternative. Compared to the much longer delay of approximately 65° which is represented by arrow 64 between points 60 and 62, the present invention provides a significant improvement even when it is extended to approximately 20° between points 70 and 72. One of the objects of the present invention is to assure that the fuel/air mixture remains stratified during the lo period of time when the sparkplug 20 is activated.

Figure 3:
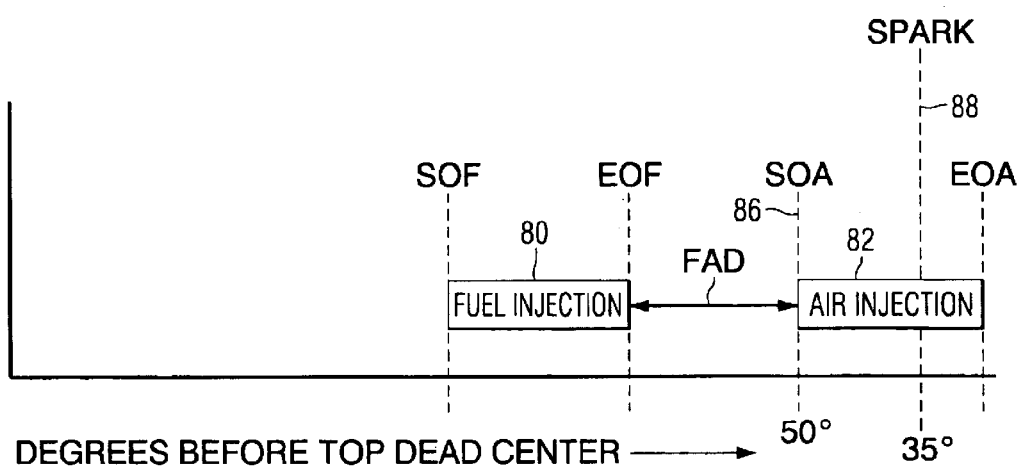
FIG. 3 shows the fuel injection timing and air injection timing in conjunction with the spark event for an internal combustion engine operated in conformance with the preferred embodiment of the present invention.

FIG. 3 is a graphical representation of the timing of the present invention in a particularly preferred embodiment. U.S. Pat. No. 5,848,582, described above, describes the related terminology and technology associated with a timing chart similar to that shown in FIG. 3. The horizontal axis in FIG. 3 represents the piston position at the time certain events take place. In association with fuel injectors used in conjunction with direct fuel injected engines, fuel is injected into a small reservoir during the time between the start of fuel (SOF) and end of fuel (EOF) events. The precise piston positions which are coincident with the start of fuel and end of fuel events are not critically important to the operation of the present invention. In addition, the length of the fuel injection event 80 is not limiting to the present invention. Point 70 in FIG. 2 represents the start of air (SOA) event at 50° before top dead center. From that instant onward, air escapes from the fuel injector and into the combustion chamber in combination with fuel that is drawn with it and injected, by the fuel injector, into the combustion chamber. This air injection 82 begins before the spark event, at 35° before top dead center, and can extend beyond it. In other words, the end of air (EOA) event can occur after the activation of the sparkplug.

In normal practice, once the timing of the start of air (SOA) event is selected, the fuel air delay (FAD) determines the time at which the end of fuel (EOF) should occur. The fuel injection time 80 then determines when the start of fuel (SOF) must begin. The two important times, in relation to the present invention, are the start of air (SOA) and the spark event, which are represented by dashed lines 86 and 88, respectively. One of the objectives of the present invention is to assure that the fuel/air charge remains stratified at the time of spark ignition. By reducing the length of time between the injection event 70 and the ignition event 72, the existence of a stratified charge is assured to the degree necessary to obtain the advantages of the present invention.

Although FIG. 3 shows the precise start of air, represented by dashed line 86, being exactly at 50° before top dead center (BTDC), it should be understood that slight variations in this timing are possible and within the scope of the present invention. The reduced time between the injection event 70 and the ignition event 72 significantly improves the starting characteristics of certain direct fuel injected two cycle engines because the fuel is ignited before it has an opportunity to mix in the cylinder and become homogenous. This, in turn, significantly reduces the likelihood that the fuel/air mixture will condense on the walls of the cylinders and wet the walls.

As described in greater detail above, the present invention provides a method for controlling the operation of an internal combustion engine 10 during starting procedures and comprises the steps of providing a fuel injector 24 for injecting fuel into a combustion chamber 18 within a cylinder 14 of the internal combustion engine. It also comprises the step of providing an igniting device, such as sparkplug 20 for igniting the fuel in the combustion chamber 18. It comprises the step of determining when the internal combustion engine is being started subsequent to the internal combustion engine being inoperative for a preselected period of time. This determination can be made in several ways. In one embodiment, a manually operated start switch can be monitored. When the operator of a marine vessel activates the start switch, the starting procedure will be implemented to assure that a stratified charge is available at the time when the ignition event occurs. Alternatively, the engine control module can monitor the operating speed of the engine and implement the method of the present invention when it is observed that the operating speed of the engine indicates that a starting procedure is being performed. As an example, if the internal combustion engine is operating at a speed less than 500 RPM, it can be assumed that the engine is being started. During that starting procedure, the injection timing would be approximately 50° before top dead center and the ignition timing would be approximately 35° before top dead center. A running mode can be assumed if the engine operating speed, measured by the rotational speed of the crankshaft 26 measured by the gear tooth sensor 30, is greater than 500 RPM. Between 550 RPM and 600 RPM, it can be determined that the engine is operating at idle speed. When at idle speed, the injection event can be moved to approximately 40° before top dead center and the ignition event can be moved to approximately 30° before top dead center. At running speeds, typically greater than 60° RPM, the injection timing can be increased to larger values before top dead center, with the ignition timing remaining at approximately 30° before top dead center. When the internal combustion engine 10 is operating at wide open throttle (WOT) speeds, the injection timing can be moved to approximately 180° to 225° before top dead center and the ignition timing can be moved to approximately 40° to 30° before top dead center.

Although the present invention has been described in particular detail and illustrated with specificity, it should be understood that alternative embodiments are also within its scope.

I claim:

1. A method for controlling the operation of an internal combustion engine during starting, comprising the steps of:
   providing a fuel injector for injecting fuel into a combustion chamber within a cylinder of said internal combustion engine;
   providing an igniting device for igniting said fuel in said combustion chamber of said internal combustion engine;
   determining when said internal combustion engine is being started subsequent to said internal combustion engine being inoperative for a preselected period of time;
   measuring a position of a piston within said cylinder;
   causing said fuel injector to inject fuel into said combustion chamber when said piston is at a first position within said cylinder;
   activating said igniting device when said piston is at a second position within said cylinder, said first and second positions being within twenty degrees of each other in relation to the rotational position of a crankshaft of said internal combustion engine.

2. The method of claim 1, wherein:
   said first and second positions are within twelve degrees of each other in relation to the rotational position of a crankshaft of said internal combustion engine.

3. The method of claim 1, wherein:
   said first and second positions are generally fifteen degrees apart in relation to the rotational position of a crankshaft of said internal combustion engine.

4. The method of claim 1, wherein:
   said first position occurs between forty-five and fifty-five degrees BTDC in relation to the rotational position of a crankshaft of said internal combustion engine.

5. The method of claim 1, wherein:
   said second position occurs between thirty and forty degrees BTDC in relation to the rotational position of a crankshaft of said internal combustion engine.

6. The method of claim 1, wherein:
   said activating step occurs when a fuel mixture injected by said fuel injector is stratified.

7. The method of claim 1, wherein:
   said position of said piston within said cylinder is determined relative to its top dead center position when said piston is at its maximum degree of travel in a direction toward said combustion chamber.

8. The method of claim 1, wherein:
   said determining step comprises the step of monitoring a manually operable start switch.

9. The method of claim 1, wherein:
   said determining step comprises the step of measuring an operating speed of said internal combustion engine and comparing said operating speed to a threshold speed magnitude.

10. The method of claim 1, wherein:
    said igniting device is a spark plug.

11. The method of claim 1, wherein:
    said internal combustion engine is a direct fuel injected two cycle engine.

12. A method for controlling the operation of two cycle internal combustion engine during starting, comprising the steps of:
    providing a fuel injector for injecting fuel into a combustion chamber within a cylinder of said internal combustion engine;
    providing a spark plug for igniting said fuel in said combustion chamber of said internal combustion engine;
    determining when said internal combustion engine is being started subsequent to said internal combustion engine being inoperative for a preselected period of time;
    measuring a position of a piston within said cylinder;
    causing said fuel injector to inject fuel into said combustion chamber when said piston is at a first position within said cylinder;
    activating said igniting device when said piston is at a second position within said cylinder, said first and second positions being within eighteen degrees of each other in relation to the rotational position of a crankshaft of said internal combustion engine.

13. The method of claim 12, wherein:
    said first and second positions are within fifteen degrees of each other in relation to the rotational position of a crankshaft of said internal combustion engine.

14. The method of claim 12, wherein:
    said first position occurs between forty-five and fifty-five degrees BTDC in relation to the rotational position of a crankshaft of said internal combustion engine; and
    said second position occurs between thirty and forty degrees BTDC in relation to the rotational position of a crankshaft of said internal combustion engine.

15. The method of claim 14, wherein:
    said activating step occurs when a fuel mixture injected by said fuel injector is stratified.

16. The method of claim 15, wherein:
    said position of said piston within said cylinder is determined relative to its top dead center position when said piston is at its maximum degree of travel in a direction toward said combustion chamber.

17. A method for controlling the operation of two cycle direct fuel injected internal combustion engine during starting, comprising the steps of:
    providing a fuel injector for injecting fuel into a combustion chamber within a cylinder of said internal combustion engine;
    providing a spark plug for igniting said fuel in said combustion chamber of said internal combustion engine;
    determining when said internal combustion engine is being started subsequent to said internal combustion engine being inoperative for a preselected period of time;
    measuring a position of a piston within said cylinder;
    causing said fuel injector to inject fuel into said combustion chamber when said piston is at a first position within said cylinder;
    activating said igniting device when said piston is at a second position within said cylinder, said first and second positions being within approximately fifteen degrees of each other in relation to the rotational position of a crankshaft of said internal combustion engine.

18. The method of claim 17, wherein:

said first position occurs between forty-five and fifty-five degrees BTDC in relation to the rotational position of a crankshaft of said internal combustion engine; and said second position occurs between thirty and forty degrees BTDC in relation to the rotational position of a crankshaft of said internal combustion engine.

19. The method of claim 18, wherein:

said activating step occurs when a fuel mixture injected by said fuel injector is stratified.

20. The method of claim 19, wherein:

said position of said piston within said cylinder is determined relative to its top dead center position when said piston is at its maximum degree of travel in a direction toward said combustion chamber.

* * * * *